(12) United States Patent
Kim et al.

(10) Patent No.: US 8,515,169 B2
(45) Date of Patent: Aug. 20, 2013

(54) APPARATUS AND METHOD FOR REMOVING RED-EYE IN A TWO-DIMENSIONAL (2D) IMAGE

(75) Inventors: Kang Joo Kim, Gyunggi-do (KR); Bong Soon Kang, Busan (KR); Suk Chan Kim, Busan (KR); Won Woo Jang, Busan (KR); Sung Jin Lee, Busan (KR); Jung Hwan Park, Busan (KR); Hak Sun Kim, Daejeon (KR); Won Tae Choi, Gyunggi-do (KR); Boo Dong Kwak, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/616,592

(22) Filed: Sep. 14, 2012

(65) Prior Publication Data

US 2013/0011060 A1    Jan. 10, 2013

(30) Foreign Application Priority Data

Mar. 7, 2008 (KR) .................. 10-2008-0021236
May 14, 2008 (KR) .................. 10-2008-0044444

(51) Int. Cl.
*G06K 9/00* (2006.01)
(52) U.S. Cl.
USPC ............ 382/167; 382/162; 382/164; 382/275
(58) Field of Classification Search
USPC .................. 382/162, 164, 167, 169, 175, 275; 345/421; 378/62, 98.9; 250/591; 356/5.04; 313/373
See application file for complete search history.

(56) References Cited

U.S. PATENT DOCUMENTS

| | | | |
|---|---|---|---|
| 6,320,580 B1 | 11/2001 | Yasui et al. ............ | 345/421 |
| 7,978,909 B2 * | 7/2011 | Umeda ............ | 382/162 |
| 8,045,795 B2 * | 10/2011 | Umeda ............ | 382/167 |
| 8,073,233 B2 | 12/2011 | Kanda ............ | 382/133 |

FOREIGN PATENT DOCUMENTS

| | | | |
|---|---|---|---|
| JP | 2004-164276 | | 6/2004 |
| JP | 2004-280334 | | 10/2004 |
| JP | 2005071389 A | * | 3/2005 |
| KR | 1998-066129 | | 10/1998 |

OTHER PUBLICATIONS

Korean Office Action issued on Nov. 19, 2009 in corresponding Korean Patent Application 10-2008-0021236.
Restriction Requirement mailed Dec. 30, 2011, issued in corresponding U.S. Appl. No. 12/273,878.
Office Action mailed Jan. 31, 2012, issued in corresponding U.S. Appl. No. 12/273,878.
Notice Allowance mailed May 10, 2012, issued in corresponding U.S. Appl. No. 12/273,878.
Communication mailed Jun. 29, 2012, issued in corresponding U.S. Appl. No. 12/273,878.
Notice Allowance mailed Aug. 10, 2012, issued in corresponding U.S. Appl. No. 12/273,878.
U.S. Appl. No. 12/273,878, filed Nov. 19, 2008, Kang Joo Kim et al., Samsung Electro-Mechanics Co., Ltd.

* cited by examiner

*Primary Examiner* — Anh Do

(57) ABSTRACT

An apparatus and method for removing red-eye in a 2D image, which can remove red-eye more naturally and apply a gain for a real-time correction on input pixels by differently performing a correction degree according to positions of pixels included in red-eye.

12 Claims, 18 Drawing Sheets

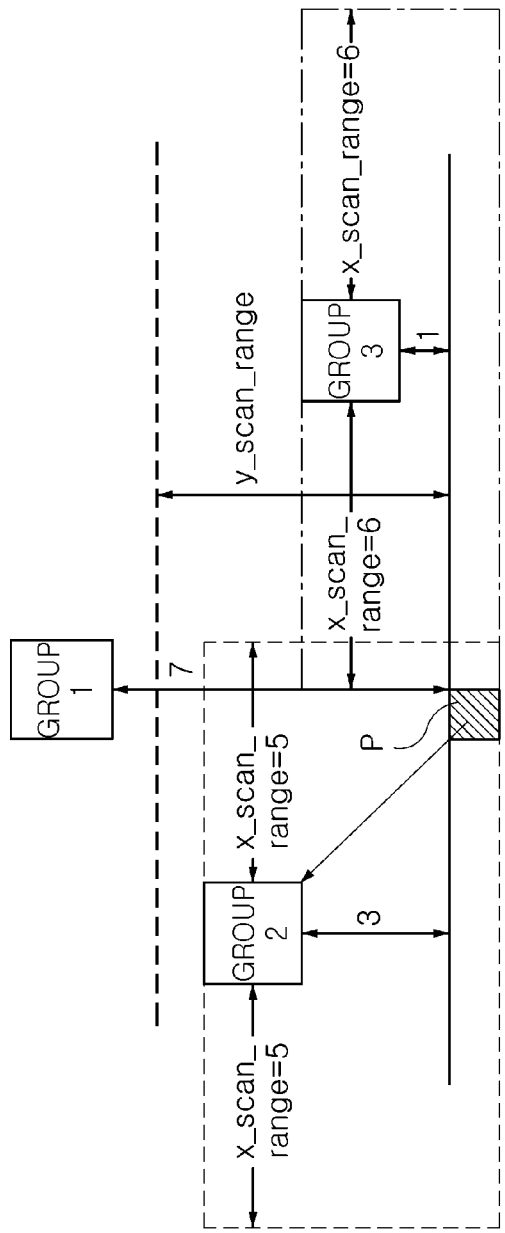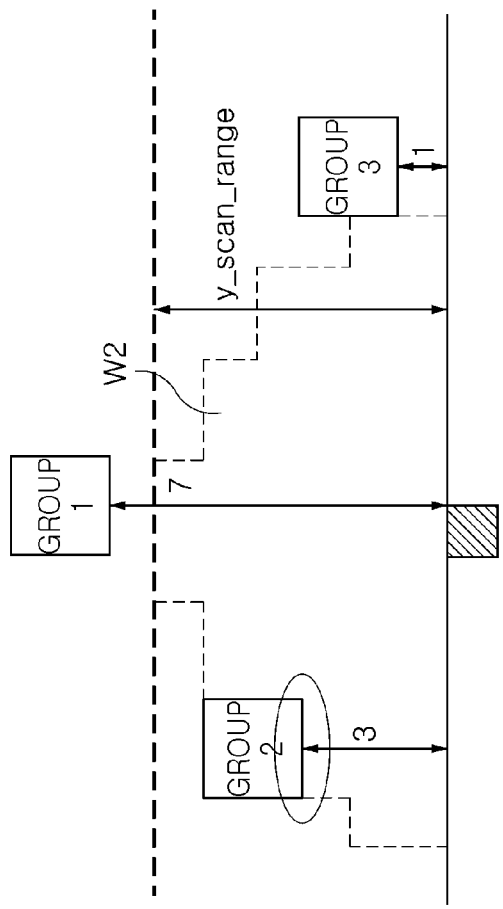

GROUP 4
GROUP 3
GROUP 6
GROUP 2
GROUP 5
GROUP 1
FIG. 10

APPARATUS AND METHOD FOR REMOVING RED-EYE IN A TWO-DIMENSIONAL (2D) IMAGE

CROSS-REFERENCE TO RELATED APPLICATIONS

This application is a U.S. divisional application filed under 37 CFR 1.53(b) claiming priority benefit of U.S. Ser. No. 12/273,878, filed in the United States on Nov. 19, 2008, now allowed, which claims earlier priority benefit to Korean Patent Application No. 2008-21236 filed on Mar. 7, 2008, and the priority of Korean Patent Application No. 2008-44444 filed on May 14, 2008, the disclosures of which are incorporated herein by reference.

BACKGROUND

1. Field

The present invention relates to a digital image processing field, and in particular, to a Two-Dimensional (2D) image segmentation apparatus and method, which segment the pixels of a progressive input image for detecting a specific pattern of the image, and an apparatus and method for removing red-eye in 2D image, which can remove red-eye in the segmented area.

2. Description of the Related Art

Recently, a pattern recognition technology that recognizes a specific shape through an image process is applied to a variety of industry fields. Examples of the pattern recognizing technology include well-known pattern recognition technologies such as a pattern recognition system that detects eyelid tremor in order to prevent to drive while drowsy, a character recognition system that recognizes characters from an image scanned through a scanner, and a fingerprint recognition system.

Such a pattern recognition technology requires a technology that segments the pixels of an entire image in order to detect shapes for recognition from the entire image generated by a camera and the like.

Generally, a segmentation algorithm used in the pattern recognition technology includes the first analysis process that analyzes a feature of a portion of an input image to be detected from the input image, and the second analysis process that transforms the input image into a binary image representing only specific information and thereafter recognizes it as one group using the shape information of a portion of the input image to be detected through the first analysis process. For example, the pattern recognition process, which recognizes eye regions for removing red-eye in an image photographed by a camera, is a process that generates the binary image representing only pixels representing red in an image photographed through the first analysis process, and segments each of pixels of the binary image through the second analysis process to determine groups corresponding to the shapes of eyes. In such a pattern recognition process, the segmentation algorithm may be performed.

Examples of a related art image segmentation algorithm include a grass-fire algorithm that detects patterns in eight directions at one point to perform segmentation, and an algorithm that pre-inputs information of patterns and detects patterns using a correlation with an input image. However, in a case of the related segmentation algorithm, since an operation time is very slow and a complicated operation is required, a microprocessor must necessarily be used for the operation process. Accordingly, in a case of the related art segmentation algorithm, it is impossible to perform a real-time segmentation process on the pixels of a progressive input image, and the cost increases due to an expensive microprocessor. Moreover, it is difficult to apply the related art segmentation algorithm to devices requiring miniaturization such as portable phones.

On the other hand, the related art image segmentation algorithm can be applied to a technology for removing red-eye in a digital image. That is, a segmentation on red-eye occurring areas in a Two-Dimensional (2D) digital image is performed using the related art segmentation algorithm, and a red-eye removing algorithm can be applied using the coordinates of the segmented areas.

Generally, examples of the related art technology for removing red-eye include a scheme that replaces a red-eye occurring area with a specific color, and a scheme that manipulates an image through masking.

The scheme replacing with a specific color that determines which area an input pixel is in, and thereafter checks whether a color of a corresponding pixel is in a skin color area or a color corresponding to red-eye when the input pixel is in an area to be manipulated. At this point, when the check result shows that the color of the corresponding pixel is the color corresponding to red-eye, the corresponding pixel is replaced with black. Since such a scheme requires a small amount of operation and a small memory space, it requires a very fast operation speed and a small memory space. However, when a pixel determined as red-eye is replaced with a specific color, an image-manipulated fact can clearly be represented because the colors of eyes become monotonous.

The masking-based scheme is a scheme that makes a color near to black by applying a mask having the same size as that of an area having a low coefficient to the area to be manipulated. Because the masking-based scheme can make the colors of eyes natural, it reduces the possibility that users can recognize a color-manipulated fact. However, the masking-based scheme requires a space to store an area to be manipulated, and thus a size of a memory space increases because information to be stored increases as a size of an area to be manipulated increases. Furthermore, in a case of the masking-based scheme, since a size of an area to be manipulated varies, the mask must also be variable. Moreover, since an operation speed becomes slow as an operation area increases, the masking-based scheme is unsuitable for a system requiring a high-speed operation.

SUMMARY

An aspect of the present invention provides a Two-Dimensional (2D) image segmentation apparatus and method, which can perform a real-time segmentation on each of the pixels of a progressive input 2D image and require no additional hardware resources due to the simplification of an operation.

Another aspect of the present invention provides an apparatus and method for removing red-eye in 2D image, which can remove red-eye more naturally and apply a gain for a real-time correction on input pixels by differently performing a correction degree according to positions of pixels included in red-eye.

According to an aspect of the present invention, there is provided a 2D image segmentation apparatus for segmenting pixels of a progressive input 2D image, including: a group information storing unit storing information of pixel groups including a plurality of adjacent pixels; a pixel determining unit determining coordinates of an input pixel, and determining whether the input pixel is an effective pixel for segmentation; a group scanning unit scanning a adjacent pixel group disposed in a scan range preset from the effective pixel in the group storing unit when the input pixel is determined as the effective pixel by the pixel determining unit; and a group information updating unit updating information of a pixel group stored in the group information storing unit according to whether there is the scanned adjacent pixel group and a pixel group including an input pixel preceding the effective pixel.

According to another aspect of the present invention, there is provided a 2D image segmentation method for segmenting pixels of a progressive input 2D image, including: determining coordinates of an input pixel, and determining whether the input pixel is an effective pixel for segmentation; scanning a adjacent pixel group disposed in a scan range preset from the effective pixel in the group storing unit storing information of a pixel group when the input pixel is determined as the effective pixel; and updating information of the pixel group stored in the group information storing unit according to whether there is the scanned adjacent pixel group and a pixel group including an input pixel preceding the effective pixel.

According to another aspect of the present invention, there is provided an apparatus for removing red-eye in 2D image, including: a reference length calculating unit receiving coordinate information of an area including red-eye in an entire image, and determining center coordinates of the area and a reference length from the center coordinates; a pixel length calculating unit sequentially receiving each of pixels of the image, and calculating a pixel length being a distance between the each pixel and the center of the area; a section determining unit comparing the reference length with a pixel length, selecting a pixel, the pixel length of which is less than the reference length, and determining a section including the selected pixel among predetermined sections according to a distance from the center coordinates; and an image manipulating unit setting a brightness gain and color gain for each section, and applying the brightness gain and the color gain to correct a pixel value of the selected pixel.

According to another aspect of the present invention, there is provided a method for removing red-eye in 2D image, including: receiving coordinate information of an area including red-eye in an entire image; determining a reference length from the center coordinates and center coordinates of the received area; sequentially receiving each of pixels of the image, and calculating a pixel length being a distance between the each pixel and the center of the area; comparing the reference length with a pixel length, selecting a pixel, the pixel length of which is less than the reference length, and determining a section including the selected pixel among predetermined sections according to a distance from the center coordinates; and setting a brightness gain and color gain for each section, and applying the brightness gain and the color gain to correct a pixel value of the selected pixel.

BRIEF DESCRIPTION OF THE DRAWINGS

The above and other aspects, features and other advantages of the present invention will be more clearly understood from the following detailed description taken in conjunction with the accompanying drawings, in which:

FIGS. 6A, 6B, 7A, 7B, 8A and 8B are exemplary diagrams for describing a method for setting an adjacent pixel group scan range according to an embodiment of the present invention;

FIG. 10 is an exemplary diagram illustrating types of a plurality of pixel groups stored in a group information storing unit according to an embodiment of the present invention;

DESCRIPTION OF EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Accordingly, it is noted that the dimensions of the elements illustrated in the accompanying drawings may be exaggerated for clarity.

Figure 1:
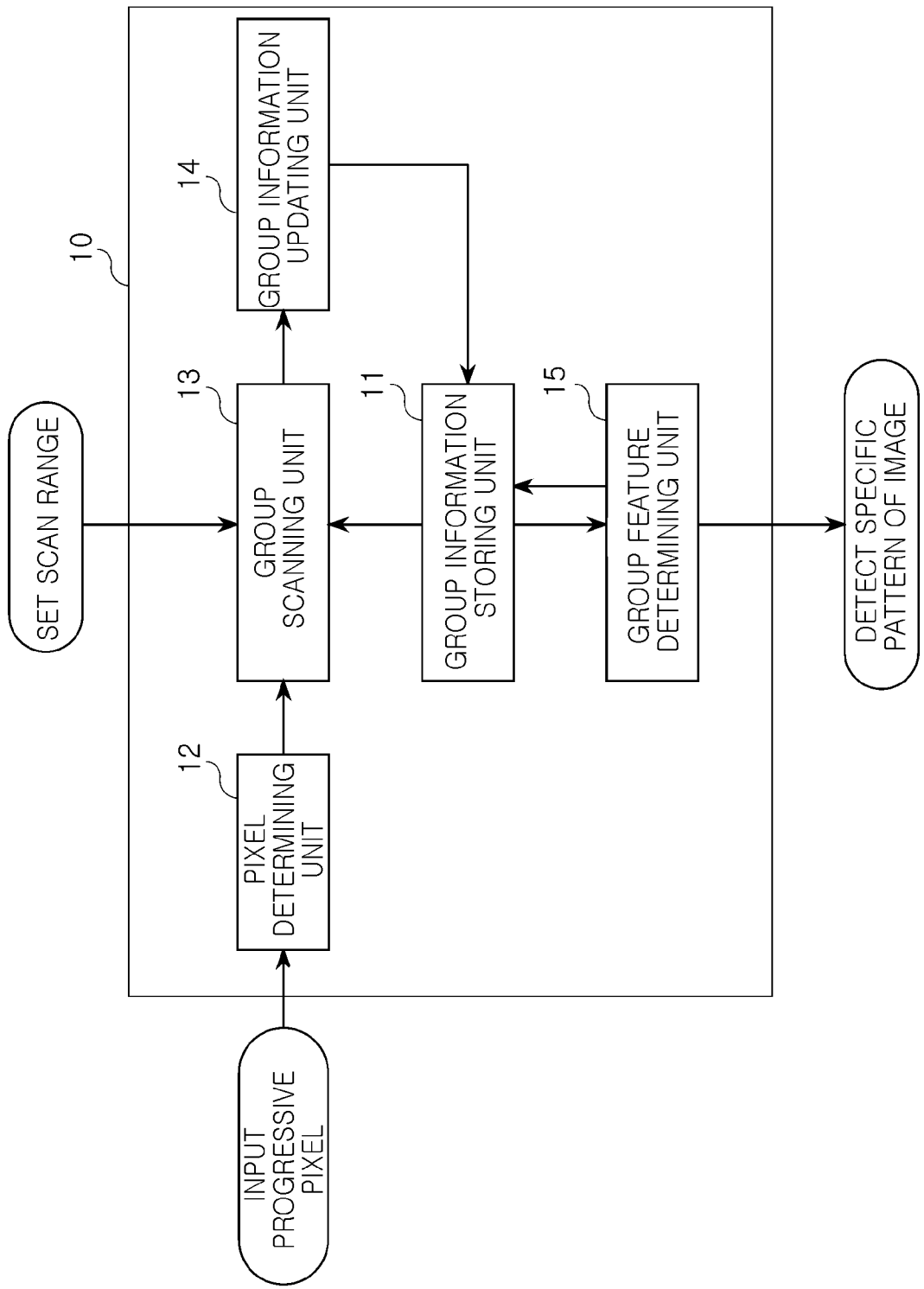
FIG. 1 is a block diagram of a Two-Dimensional (2D) image segmentation apparatus according to an embodiment of the present invention.

FIG. 1 is a block diagram of a Two-Dimensional (2D) image segmentation apparatus according to an embodiment of the present invention.

Referring to FIG. 1, the 2D image segmentation apparatus 10 according to an embodiment of the present invention includes a group information storing unit 11 storing information of pixel groups consisting of a plurality of adjacent pixels, a pixel determining unit 12 determining the coordinates of a pixel of a progressive input 2D image, and determining whether the input pixel is an effective pixel for segmentation, a group scanning unit 13 scanning a adjacent pixel group disposed in a scan range preset from the effective pixel in the group storing unit 11 when the input pixel is determined as the effective pixel by the pixel determining unit 12, and a group information updating unit 14 updating information of a pixel group stored in the group information storing unit 11 according to whether there is the scanned adjacent pixel group and a pixel group including an input pixel preceding the effective pixel.

The 2D image segmentation apparatus 10 according to an embodiment of the present invention may further include a group feature determining unit 15 determining whether a corresponding pixel group is effective according to the number of pixels included in a pixel group determined as the update completion of group information among the pixel groups stored in the group information storing unit 11 and the width-to-height ratio of the pixel group determined as the update completion of the group information, and deleting group information of a pixel group determined as an ineffective pixel group from the group information storing unit 11.

Figure 2:
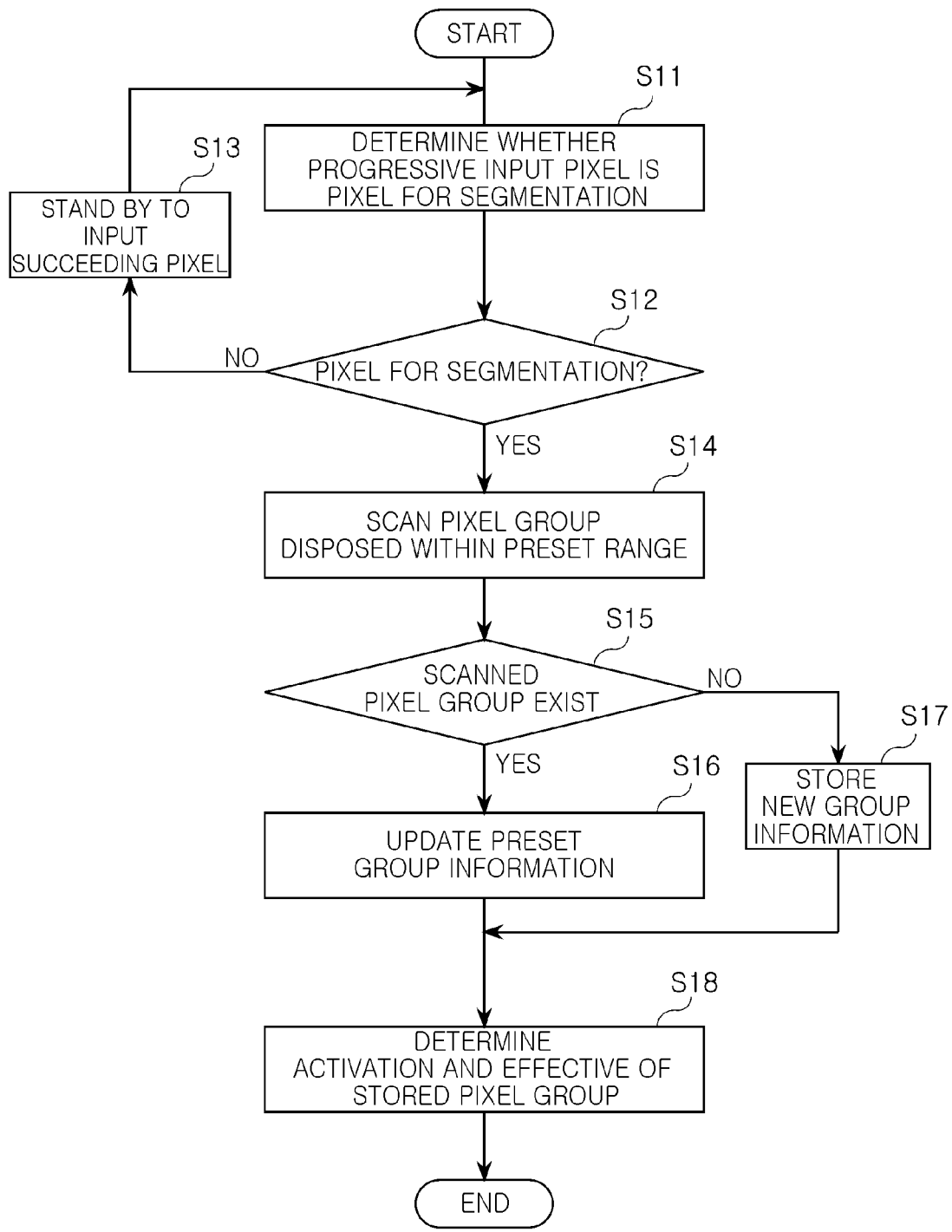
FIG. 2 is a flowchart illustrating a 2D image segmentation method according to an embodiment of the present invention.

FIG. 2 is a flowchart illustrating a 2D image segmentation method according to an embodiment of the present invention.

Referring to FIG. 2, the 2D image segmentation method according to an embodiment of the present invention includes operations S11 to S17. The operation S11 determines the coordinates of a pixel of a progressive input 2D image, and determines whether the input pixel is effective pixel for segmentation. When the input pixel is determined as an ineffective pixel for segmentation by the pixel determining unit 12 in the operation S12, the operation S13 is in a standby state for receiving a succeeding input pixel. When the input pixel is determined as the effective pixel for segmentation by the pixel determining unit 12 in the operation S12, the operation S14 scans a adjacent pixel group disposed in a scan range preset from the effective pixel in the group information storing unit 11 storing information of pixel groups. The operations S15 to S17 updates information of a pixel group stored in the group information storing unit 11 according to whether there exists the scanned adjacent pixel group and a pixel group including an input pixel preceding the effective pixel.

The 2D image segmentation method according to an embodiment of the present invention may further includes an operation S18 that determines whether a corresponding pixel group is effective according to the number of pixels included in a pixel group determined as the update completion of group information among the pixel groups stored in the group information storing unit 11 and the width-to-height ratio of the pixel group determined as the update completion of the group information, and an operation (not shown) that deletes group information of a pixel group determined as an ineffective pixel group from the group information storing unit 11.

Hereinafter, the 2D image segmentation apparatus and method according to an embodiment of the present invention having the elements of FIGS. 1 and 2 will be described in detail with reference to the accompanying drawings.

Generally, in a case of an image photographed by an image sensor (Charge-Coupled Device (CCD) or Complementary Metal-Oxide Semiconductor (CMOS)) such as a digital camera, all pixels included in one frame are not input at a time but sequentially input according to a certain order. Particularly, pixels, which have a matrix structure and are disposed in an image, have a progressive input form that pixels included in one column are input in a row order and pixels included in a succeeding column are input in a row order, wherein the input of pixels starts from a pixel disposed in the first row of the first column. An embodiment of the present invention may be applied in an input order on each of image pixels which are input in the progressive input form.

Figure 3B:
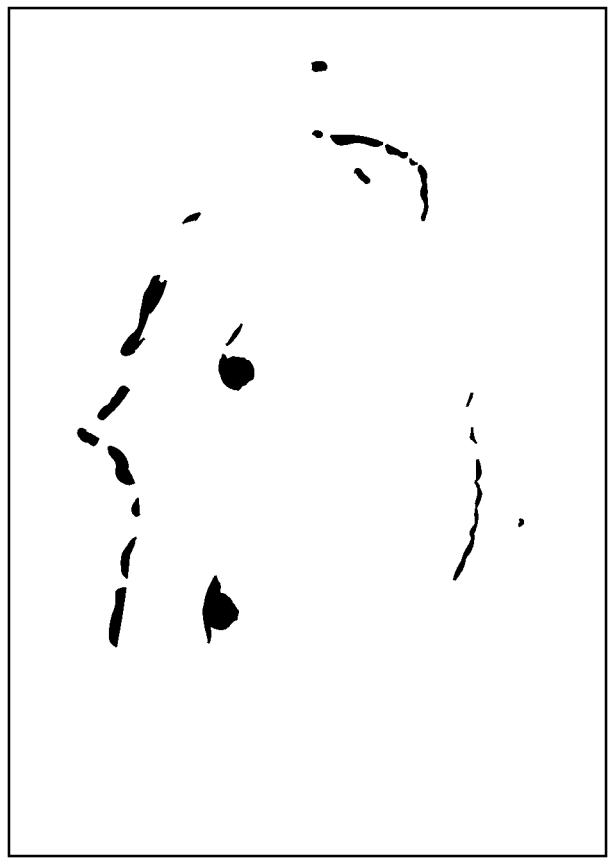
FIGS. 3A and 3B is an exemplary diagram for describing a binary image to which an embodiment of the present invention is applied.
Figure 3A:
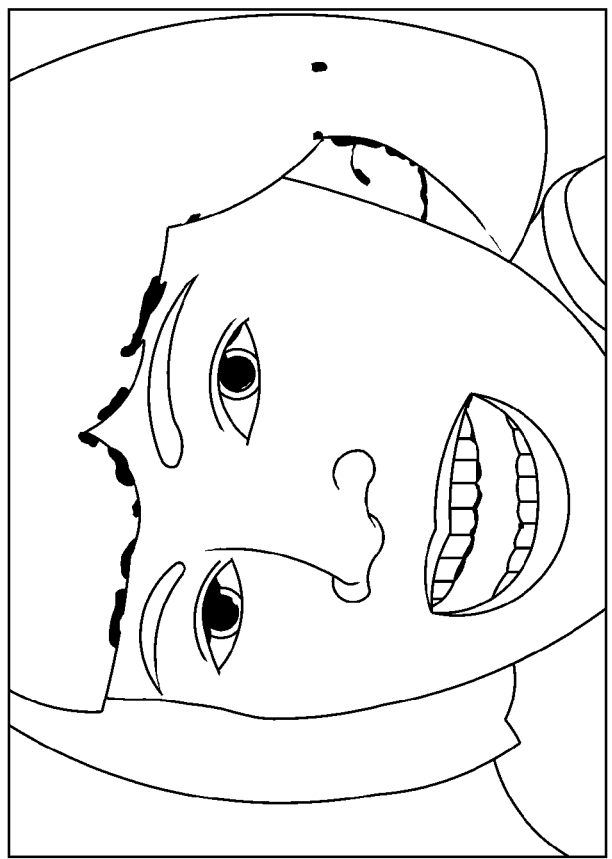

An input image to which an embodiment of present invention is applied may be a binary image which represents only a pixel having a desired feature by applying a specific mask to a common image. For example, in a case where pixels representing red are extracted for removing red-eye from a general image illustrated in FIG. 3(*a*), if a red mask is applied, a binary image can be obtained in which only pixels including red more than a certain level is displayed in black (have a value of 1) and another pixels are displayed in white (have a value of 0) as illustrated in FIG. 3(*b*).

In an embodiment of the present invention as described above, when a binary image representing pixels having specific information is input in a progressive-scanning scheme, the pixel determining unit 12 determines the coordinates of a current input pixel and determines whether the input pixel is a pixel for segmentation in the operation S11. For example, the pixel determining unit 12 can determine whether the input pixel has a value of 1 or 0 in the binary image and determine a pixel having the value of 1 as an effective pixel. A pixel that is not determined as the effective pixel by the pixel determining unit 12, i.e., a pixel having the value of 0 is not applied to a set of processes according to an embodiment of the present invention described below, and the pixel determining unit 12 is in a standby state for receiving a succeeding input pixel in the operation S13.

The group scanning unit 13 scans a group adjacent to a current effective pixel using information of the pixel groups pre-stored in the group information storing unit 11, on pixels determined as the effective pixel by the pixel determining unit 12 in the operations S12 and S14.

Figure 4:
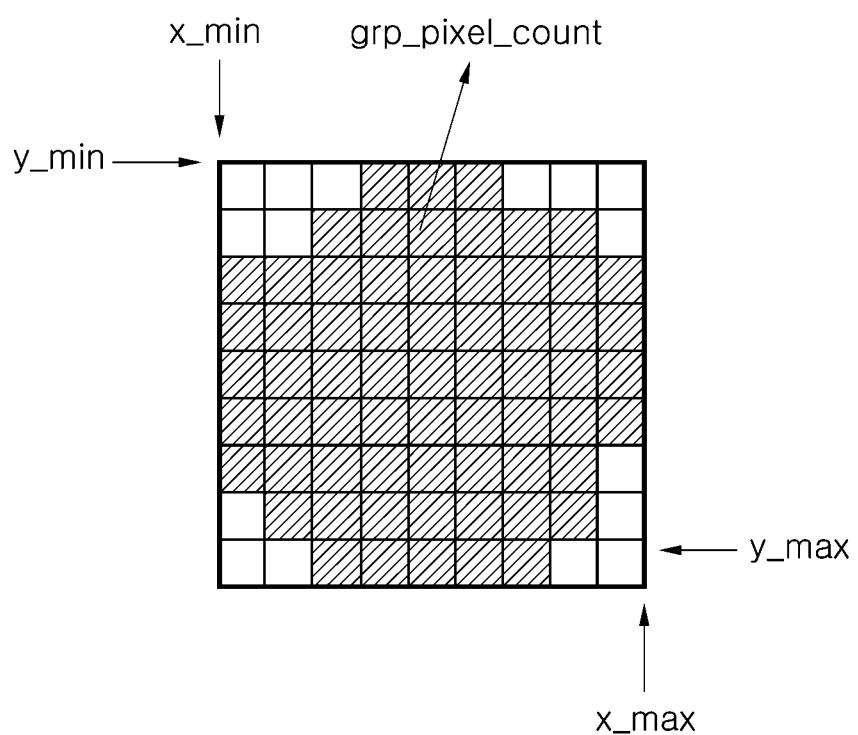
FIG. 4 is an exemplary diagram of one pixel group which is segmented.
Figure 5:
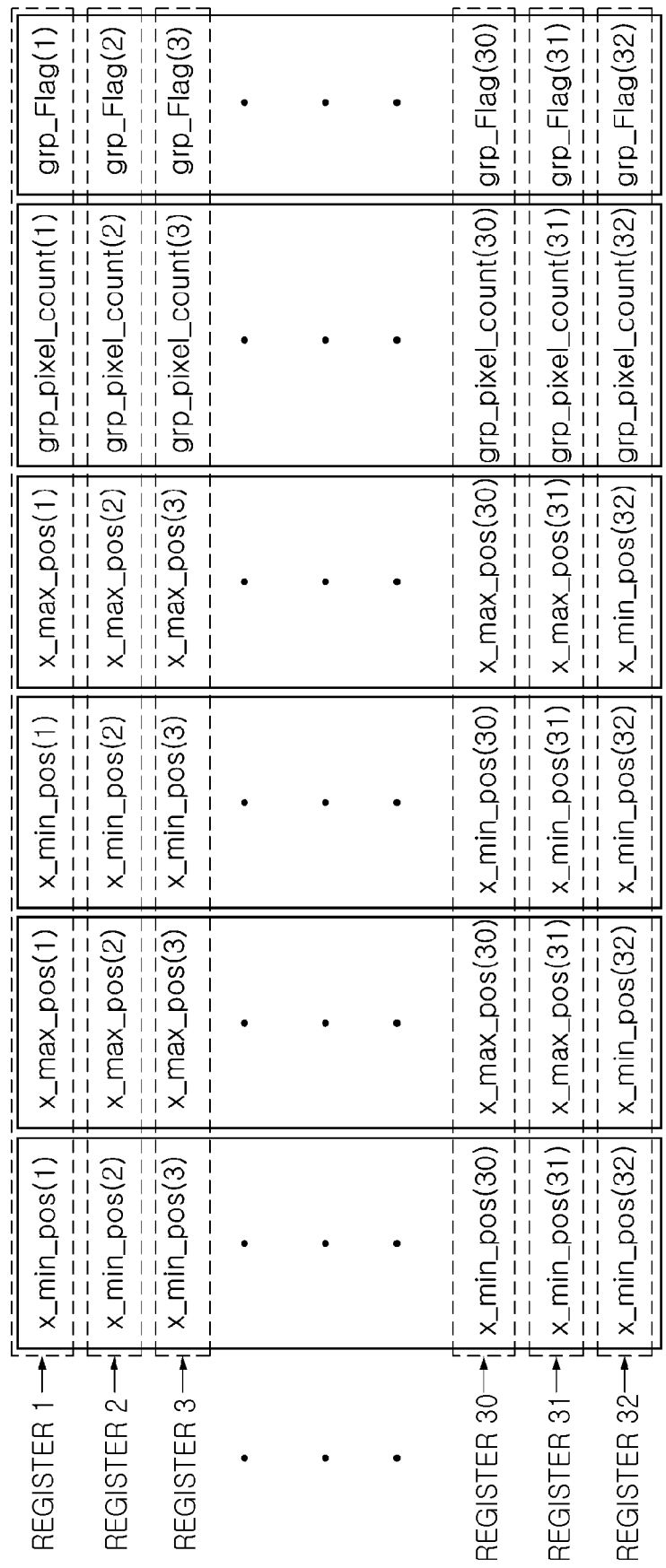
FIG. 5 illustrates a plurality of registers storing group information of thirty-two groups.

The group information storing unit 11 is an element storing information of the pixel groups consisting of a plurality of adjacent pixels, may store the information of each of the pixel groups in a register form. FIG. 4 is an exemplary diagram of one pixel group which is segmented. FIG. 5 illustrates a plurality of registers storing group information of thirty-two groups. As illustrated in FIG. 4, group information of one pixel group may be represented as the horizontal minimum coordinate x_min, horizontal maximum coordinate x_max, vertical minimum coordinate y_min and vertical maximum coordinate y_max included in the pixel group and the number of pixels grp_pixel_count included in the pixel group. Moreover, as illustrated in FIG. 5, all group information may be stored in a register form.

As illustrated in FIG. 5, the group information storing unit 11 may include a flag grp_Flag representing whether the group information can be updated by a current input pixel. The flag grp_Flag represents whether a corresponding pixel group is in an activated state where the group information can be updated by the current input pixel. For example, in a case where the vertical maximum coordinate y_max of a corresponding pixel group is not within a vertical scan range of the current input effective pixel, since information of the corresponding pixel group is no longer updated, a deactivation state can be represented in the flag grp_Flag. An effectiveness determining process on a pixel group to be described below may be performed according to the flag grp_Flag.

In the operation S14 where the group scanning unit 13 scans an adjacent pixel group of an effective pixel, the group scanning unit 13 can scan an adjacent group in a preset scan range which is input from the outside by a user. A process of scanning the adjacent group may largely be divided into two schemes according to a shape of a scan range formed from a current effective pixel.

Figure 6A:
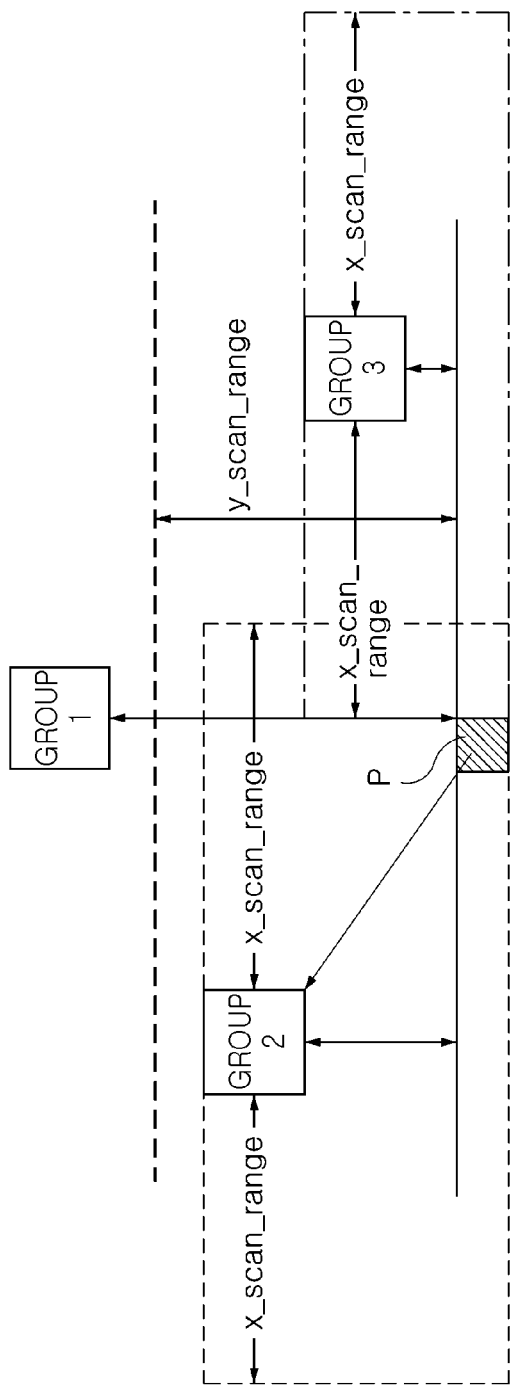
Figure 6B:
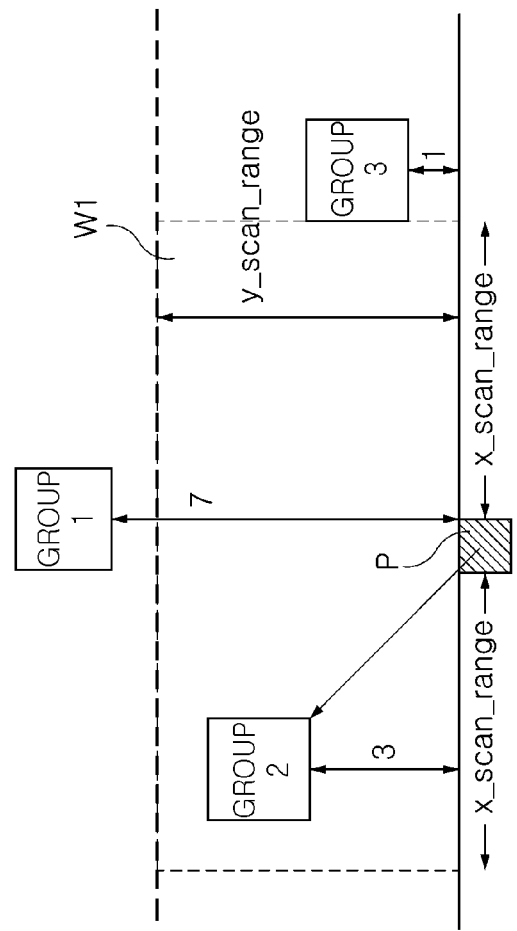

As illustrated in FIG. 6(*a*), a first scheme is a scheme that scans adjacent pixel groups by applying a preset horizontal scan range x_scan_range having the same size to an entire pixel group (group 2, group 3), at least one portion of which is included in a vertical scan range y_scan_range preset from an effective pixel P. Since such a first scheme applies the horizontal scan range x_scan_range having the same size to an entire pixel group, at least one portion of which is included in the vertical scan range y_scan_range, it may very simply be implemented. As a result, as illustrated in FIG. 6(b), the first scheme is the same as a scheme that represents a square shape of a window, which is represented as the horizontal scan range and the vertical scan range in a current effective pixel, as a scan range. However, since the first scheme applies the same horizontal scan range irrespective of a vertical distance, a pixel group, which exists in a diagonal of the square window which is more distant than a pixel group which is not included in the square window in a vertical or horizontal direction, may include an adjacent pixel group.

Figure 8A:
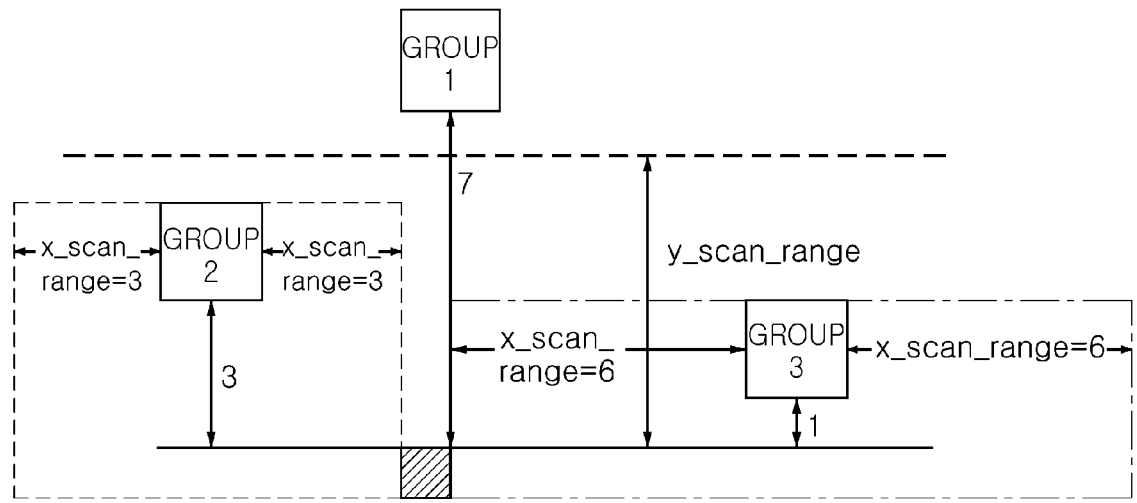

As illustrated in FIG. 7(a) or FIG. 7(b), a second scheme is a scheme that scans adjacent pixel groups by applying the preset horizontal scan range x_scan_range having a size which is varied according to a vertical distance between the effective pixel P and each pixel group to the each pixel group, at least one portion of which is included in the vertical scan range y_scan_range preset from the effective pixel P. Referring to FIG. 7(a), 5 pixel is set as the horizontal scan range x_scan_range on a group 2 among the pixel groups included in the vertical scan range y_scan_range, wherein a vertical distance from the effective pixel to the group 2 is 3 pixel. 6 pixel is set as the horizontal scan range x_scan_range on a group 3 among the pixel groups included in the vertical scan range y_scan_range, wherein a vertical distance from the effective pixel to the group 3 is 1 pixel. Referring to FIG. 8(a), 3 pixel is set as the horizontal scan range x_scan_range on a group 2 among the pixel groups included in the vertical scan range y_scan_range, wherein a vertical distance from the effective pixel to the group 2 is 3 pixel. 6 pixel is set as the horizontal scan range x_scan_range on a group 3 among the pixel groups included in the vertical scan range y_scan_range, wherein a vertical distance from the effective pixel to the group 3 is 1 pixel.

Figure 8B:
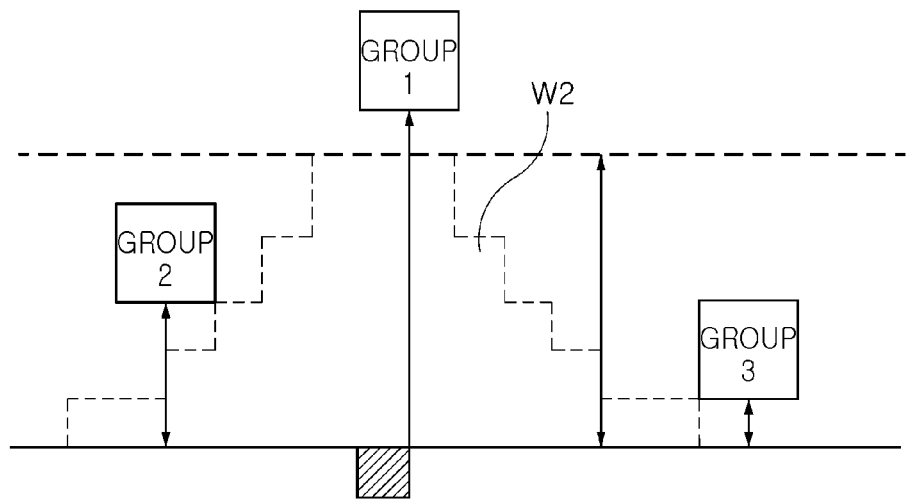

As illustrated in FIG. 7(b), the scan scheme of FIG. 7(a) presets the horizontal scan range x_scan_range according to a vertical distance from a pixel group to the effective pixel for a scan range to be a convex window W1 on a current effective pixel P. Likewise, as illustrated in FIG. 8(b), the scan scheme of FIG. 8(a) presets the horizontal scan range x_scan_range according to a vertical distance from a pixel group to the effective pixel for a scan range to be a concave window W2 on a current effective pixel P.

To set different horizontal scan ranges x_scan_range according to a vertical distance from a pixel group to an effective pixel, a user can determine an index that represents the vertical distance from the pixel group to the effective pixel, and can set a size of the horizontal scan range x_scan_range according to the index as a look-up table.

The group information updating unit 14 updates information of a pixel group stored in the group information storing unit 11 according to whether there is the scanned adjacent pixel group and a pixel group including an input pixel preceding the effective pixel in the operations S15 to S17.

Specifically, when the scan result of the operation S15 shows that there exists no group scanned by the group scanning unit 13, the group information updating unit 14 determines that a current effective pixel is the first pixel forming a new pixel group, and stores group information of the new pixel group including the current effective pixel in the group information storing unit 11 in the operation S17.

When the scan result of the operation S15 shows that there exists group scanned by the group scanning unit 13, the group information updating unit 14 can update and correct group information pre-stored in the group information storing unit 11 according to the number of the scanned groups and a group including an input pixel preceding the current effective pixel in the operation S16.

Figure 9:
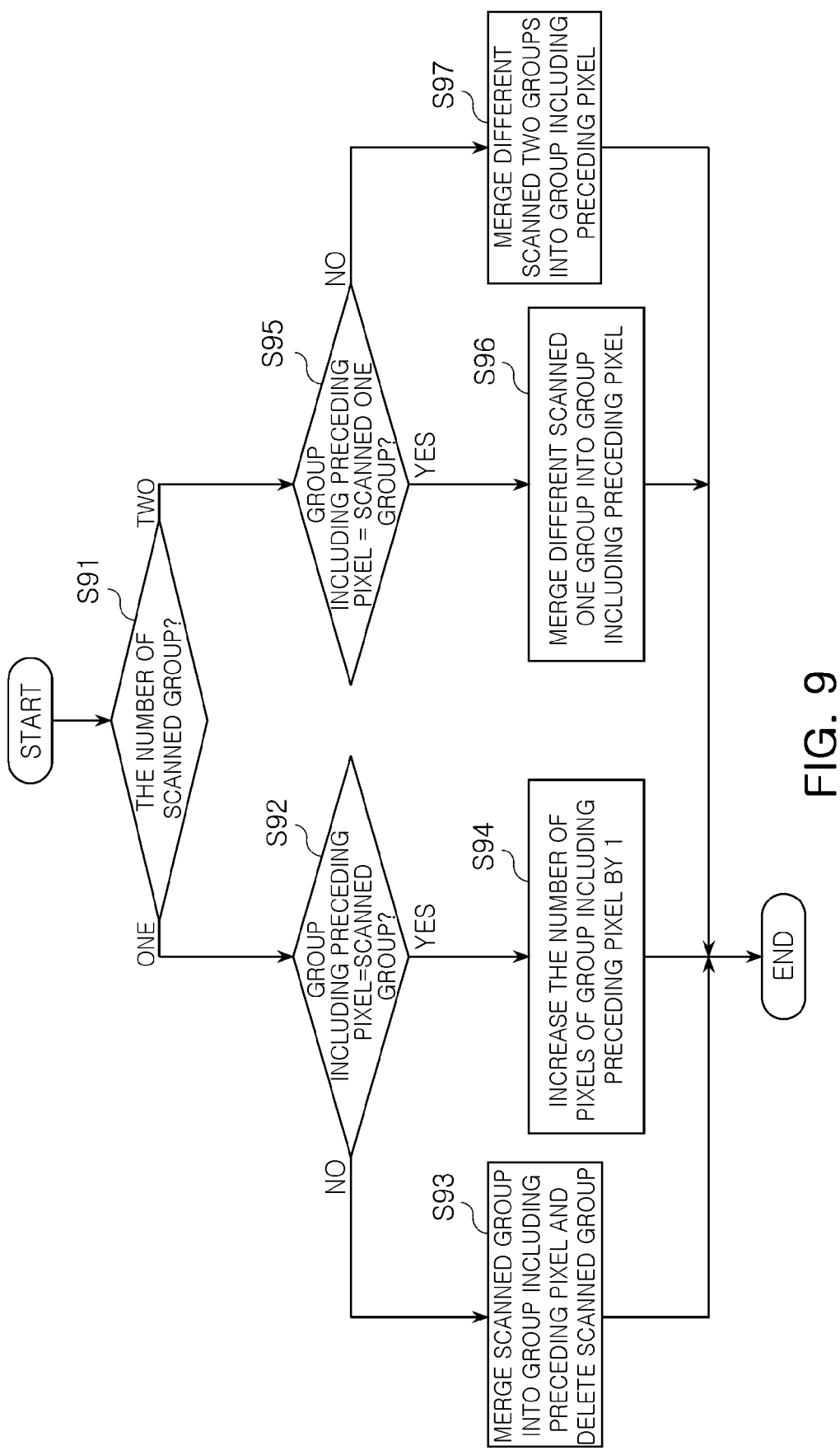
FIG. 9 is a flowchart illustrating a method for updating group information pre-stored in the group information storing unit 11 when an adjacent pixel group is scanned according to an embodiment of the present invention.

FIG. 9 is a flowchart illustrating a method for updating group information pre-stored in the group information storing unit 11 when an adjacent pixel group is scanned according to an embodiment of the present invention. Referring to FIG. 9, the number of adjacent pixel groups scanned by the group scanning unit 13 is one in operation S91. When a pixel group including a pixel preceding a current effective pixel is different from the scanned one pixel group in operation S91, the scanned one adjacent pixel group is merged into the pixel group including the preceding input pixel, information of the scanned one adjacent pixel group is deleted from the group information storing unit 11, and information of the pixel group including the preceding input pixel is updated for the effective pixel to be included in the pixel group including the preceding input pixel in operation S93.

Moreover, when the number of adjacent pixel groups scanned by the group scanning unit 13 is one in the operation S91 and the scanned one adjacent pixel group is the same as the pixel group including the preceding input pixel in the operation S92, information of the pixel group including the preceding input pixel is updated for the effective pixel to be included in the pixel group including the preceding input pixel in operation S94.

When the number of adjacent pixel groups scanned by the group scanning unit 13 is two in the operation S91 and one pixel group of the scanned two adjacent pixel groups is the same as the pixel group including the preceding input pixel in the operation S95, a pixel group which is different from the pixel group including the preceding input pixel among the scanned two adjacent pixel groups is merged into the pixel group including the preceding input pixel, information of the merged pixel group is deleted from the group information storing unit 11, and information of the pixel group including the preceding input pixel is updated for the effective pixel to be included in the pixel group including the preceding input pixel in operation S96.

When the number of adjacent pixel groups scanned by the group scanning unit 13 is two and all the scanned two adjacent pixel groups are different from the pixel group including the preceding input pixel in the operation S95, the scanned two adjacent pixel groups are merged into the pixel group including the preceding input pixel, group information of the merged two pixel groups is deleted from the group information storing unit 11, and information of the pixel group including the preceding input pixel is updated for the effective pixel to be included in the pixel group including the preceding input pixel in operation S97.

Finally, the group feature determining unit 15 determines whether a corresponding pixel group is effective according to the number of pixels included in a pixel group determined as the update completion of group information among the pixel groups stored in the group information storing unit 14 and the width-to-height ratio of the pixel group determined as the update completion of the group information, and deleting group information of a pixel group determined as an ineffective pixel group from the group information storing unit 11 in the operation S18.

That is, the group feature determining unit 15 checks the flag grp_Flag representing whether there is in an activated state about that the group information update of the pixel group is completed in group information stored in the register form in the group information storing unit 11, and checks the number of pixels included in a corresponding pixel group and the width-to-height ratio of the corresponding pixel group on a deactivated pixel group according to a result of the check. When the number of pixels of a deactivated pixel group is less than the number of preset reference pixels, the group feature determining unit 15 determines that the deactivated pixel group is different from a pixel group representing a desired pattern, and deletes a corresponding group information from the group information storing unit 11. Moreover, the group feature determining unit 15 calculates the width-to-height ratio of the deactivated pixel group using the horizontal minimum value, horizontal maximum value, vertical minimum value and vertical maximum value of the deactivated pixel group. When the calculated rate is not within a preset rate range, the group feature determining unit 15 determines that the deactivated pixel group is different from a pixel group representing a desired pattern, and deletes a corresponding group information from the group information storing unit 11. For example, as illustrated in FIG. 10, in a case where there exist a plurality of deactivated pixel groups stored in the group information storing unit 11 and the segmentation method of the present invention is applied to a system that should detect the shapes of eyes for detecting red-eye, That is, the group feature determining unit 15 determines that groups 5 and 6, which have many differences with the width-to-height ratio of eyes among pixel groups illustrated in FIG. 10, are different from a pixel group having a desired pattern, and deletes group information of corresponding pixel groups from the group information storing unit 11. On the other hand, the group feature determining unit 15 determines that groups 1 to 4 of FIG. 10 have a suitable row-column rate, and outputs corresponding pixel groups to be used for a succeeding pattern detection.

As described above, an embodiment of the present invention determines segmentation per progressive input pixel, and performs segmentation of an image through a simple operation of comparing a pixel with preset values instead of a complicated operation, thereby quickly performing segmentation of an image in real time. Furthermore, since an embodiment of the present invention requires no a microprocessor for a complicated operation, it can save both the time and the cost.

Hereinafter, an apparatus and method for removing red-eye in 2D image using the area information of a pixel group determined by the above-described segmentation apparatus and method will be described in detail.

Figure 11:
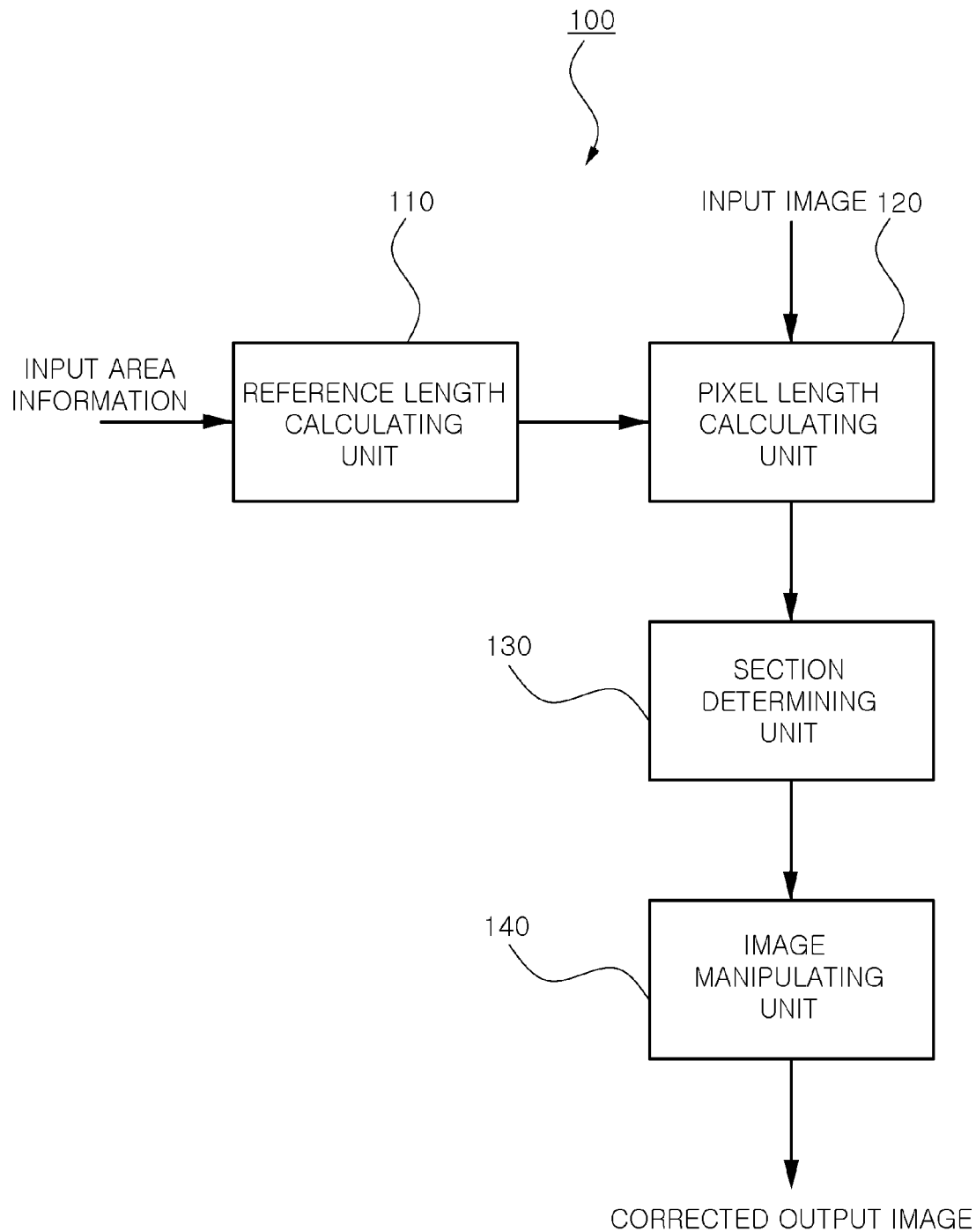
FIG. 11 is a block diagram of an apparatus for removing red-eye in 2D image according to an embodiment of the present invention.

FIG. 11 is a block diagram of an apparatus for removing red-eye in 2D image according to an embodiment of the present invention.

Referring to FIG. 11, the apparatus 100 for removing red-eye in 2D image according to an embodiment of the present invention includes a reference length calculating unit 110, a pixel length calculating unit 120, a section determining unit 130, and an image manipulating unit 140.

The reference length calculating unit 110 receives coordinate information of an area including red-eye in an entire image, and determines the center coordinates of the area and a reference length from the center coordinates.

The pixel length calculating unit 120 sequentially receives each of the pixels of the image, and calculates a pixel length being a distance between the pixel and the center of the area.

The section determining unit 130 compares the reference length with a pixel length and selects a pixel, the pixel length of which is less than the reference length. The section determining unit 130 determines a section including the selected pixel among predetermined sections according to a distance from the center coordinates.

The image manipulating unit 140 sets a brightness gain and color gain for each section, and applies the brightness gain and the color gain to correct a pixel value of the selected pixel.

Figure 12:
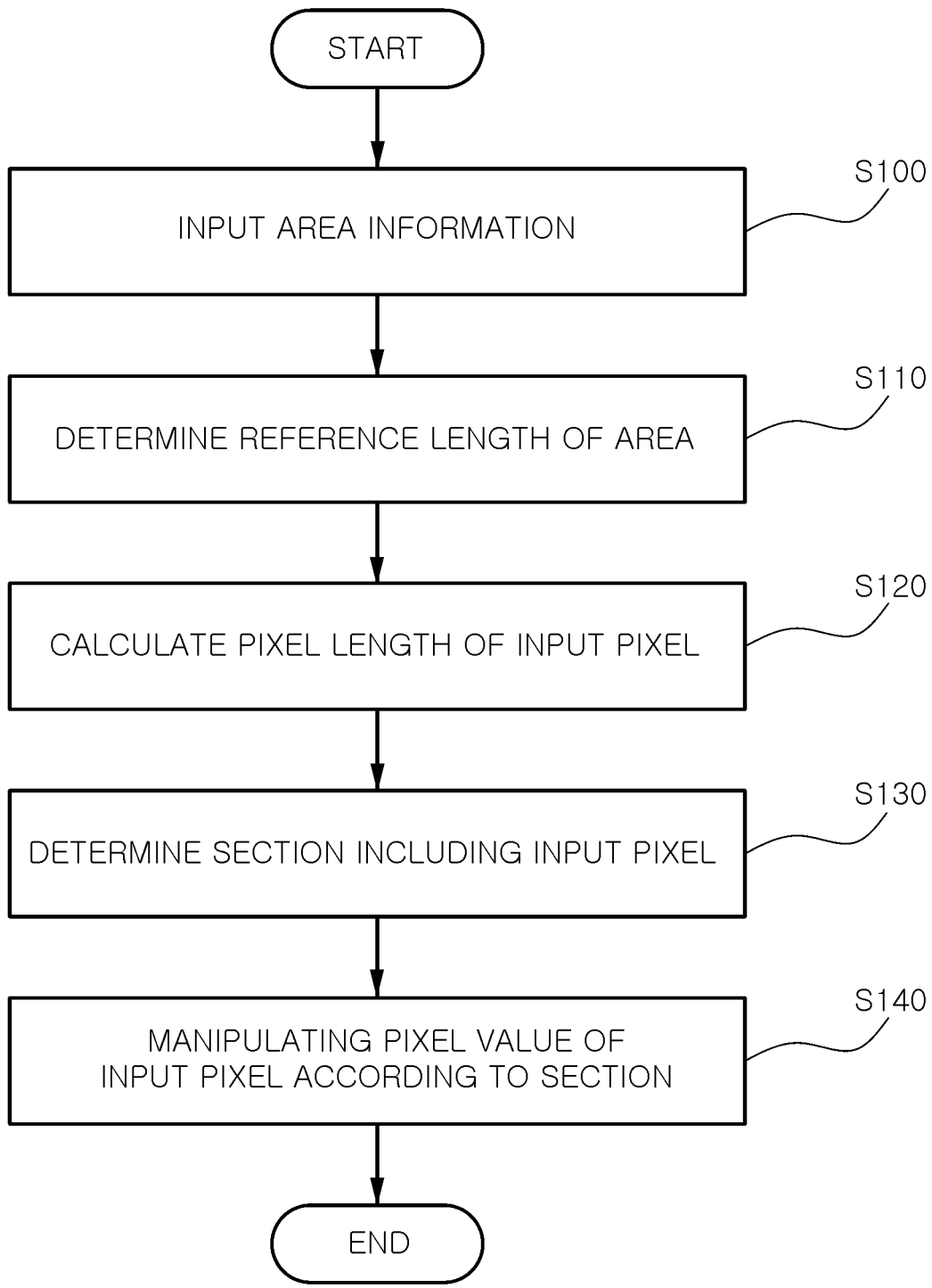
FIG. 12 is a block diagram of a method for removing red-eye in 2D image according to an embodiment of the present invention.

FIG. 12 is a block diagram of a method for removing red-eye in 2D image according to an embodiment of the present invention.

Referring to FIG. 12, the method for removing red-eye according to an embodiment of the present invention includes operations S100, S110, S120, S130 and S140. The operation S100 receives the coordinate information of an area including red-eye in an entire image. The operation S110 determines the center coordinates of the received area and a reference length from the center coordinates. The operation S120 sequentially receives each of the pixels of the image, and calculates a pixel length being a distance between the each pixel and the center of the area. The operation S130 compares the reference length with the pixel length and selects a pixel, the pixel length of which is less than the reference length. The operation S130 determines a section including the selected pixel among predetermined sections according to a distance from the center coordinates. The operation S140 sets a brightness gain and color gain for each section, and applies the brightness gain and the color gain to correct a pixel value of the selected pixel.

Figure 13:
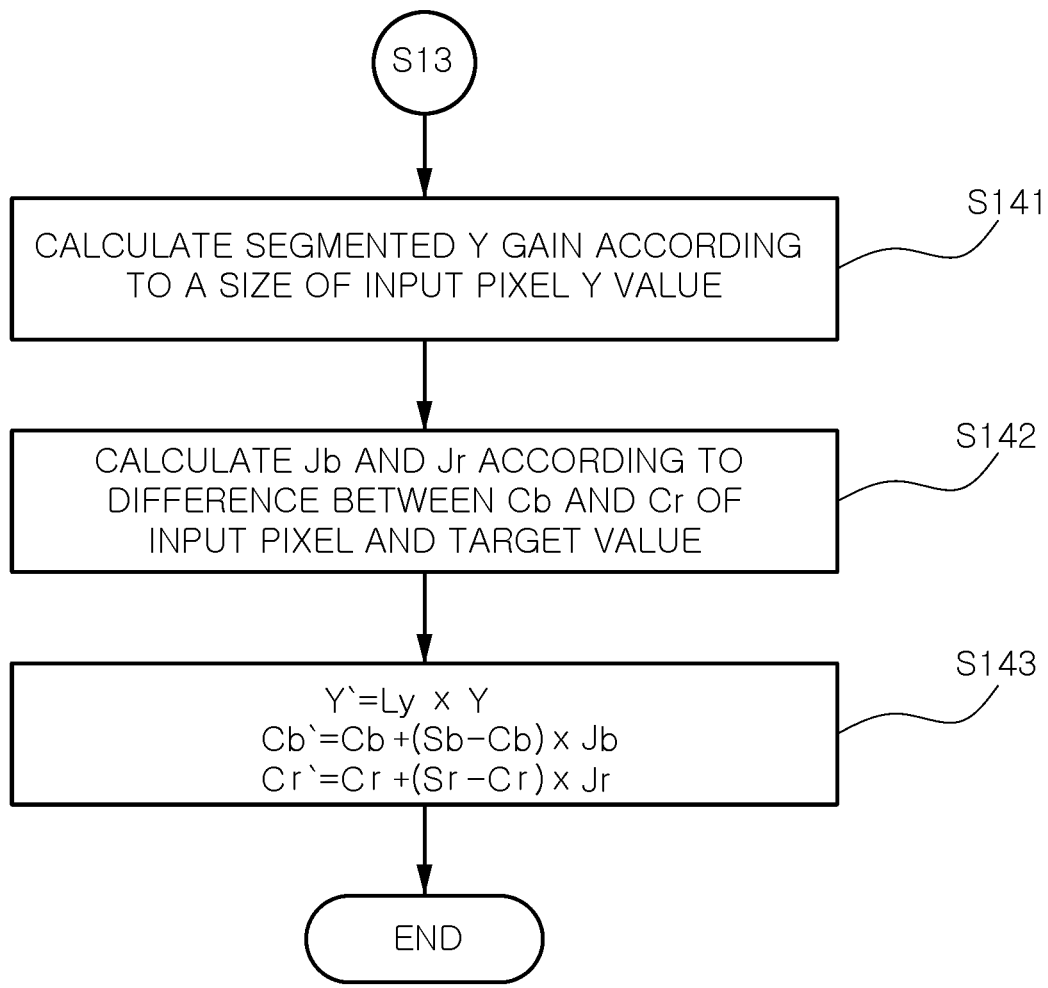
FIG. 13 is a flowchart illustrating in more detail an operation of correcting a pixel value of FIG. 12.

FIG. 13 is a flowchart illustrating in more detail the operation S140 of correcting the pixel value of FIG. 12.

Referring to FIG. 13, the operation S140 of correcting the pixel value may include operations S141 to S143. The operation S141 differently sets the brightness gain for each section according to the brightness value of the selected pixel. The operation S142 differently sets the color gain for each section according to a difference between a color value of the selected pixel and a target color value to be corrected. The operation S143 corrects the Y, Cb and Cr values of the selected pixel as expressed in Equations 1 to 3 below.

$$Y' = Ly \times Y \tag{1}$$

$$Cb' = Cb + (Sb - Cb) \times Jb \tag{2}$$

$$Cr' = Cr + (Sr - Cr) \times Jr \tag{3}$$

In the Equations 1 to 3, Y represents the Y value of the selected pixel, Cb represents the Cb value of the selected pixel, Cr represents the Cr value of the selected pixel, Ly represents a Y gain for each section, Sb represents a target Cb value to be corrected, Jb represents a Cb gain for each section, Sr represents a target Cr value to be corrected, Jr represents a Cr gain for each section, Y' represents the corrected Y value of the selected pixel, Cb' represents the corrected Cb value of the selected pixel, and Cr' represents the corrected Cr value of the selected pixel.

Hereinafter, the apparatus and method for removing red-eye in 2D image according to an embodiment of the present invention will be described in detail with reference to the accompanying drawings.

Referring to FIGS. 11 and 12, the method for removing red-eye according to an embodiment of the present invention starts from the operation S100 of inputting area information to the reference length calculating unit 110. The area information is an area including the segmented pixels that are to segment pixels expected to represent red-eye in an entire image intended to remove red-eye. The area is represented as the minimum horizontal coordinate, maximum horizontal coordinate, minimum vertical coordinate and maximum vertical coordinate of the segmented pixels. Accordingly, the area information input to the reference length calculating unit 100 is the minimum horizontal coordinate, maximum horizontal coordinate, minimum vertical coordinate and maximum vertical coordinate of the area that is to segment pixels representing red-eye. The technology associated with the segmentation of pixels has been described in detail through the 2D image segmentation apparatus and method according to embodiments of the present invention. Briefly, the apparatus and method for removing red-eye in 2D image according an embodiment of the present invention perform segmentation on an area where red-eye occurs by applying the image segmentation method according to an embodiment of the present invention, and input the coordinate information of a determined pixel group to the reference length calculating unit 110, thereby starting segmentation.

Figure 14:
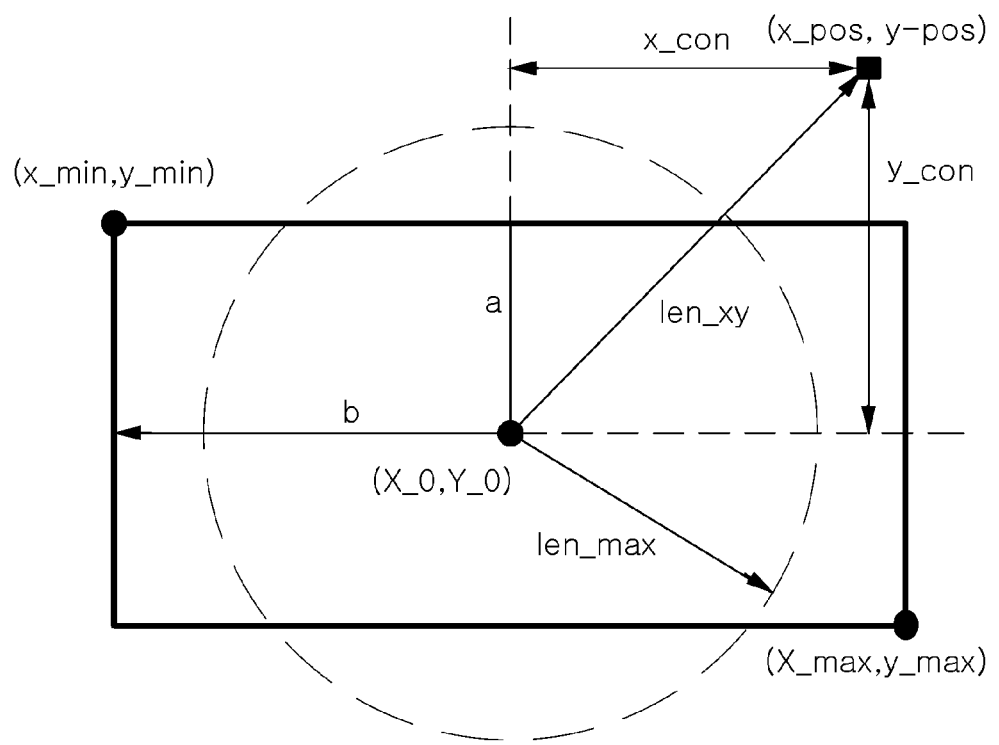
FIG. 14 is a conceptual view for describing the calculation of the coordinates, reference length and coordinate length of an applied area in an embodiment of the present invention.

FIG. 14 is a conceptual view of the area. As illustrated in FIG. 14, the area is represented as an area between the minimum horizontal coordinate x_min, maximum horizontal coordinate x_max, minimum vertical coordinate y_min and maximum vertical coordinate y_max of the segmented pixels.

The reference length calculating unit 110 determines a reference length len_max to be applied to the input area using information of the input area in the operation S110. To determine the reference length, the reference length calculating unit 110 calculates center coordinates X_0 and Y_0 of the minimum horizontal coordinate x_min, maximum horizontal coordinate x_max, minimum vertical coordinate y_min and maximum vertical coordinate y_max of the area. Herein, a middle coordinate X_0 of the minimum horizontal coordinate x_min and the maximum horizontal coordinate x_max of the area is the horizontal coordinate of the center coordinates X_0 and Y_0, and a middle coordinate Y_0 of the minimum vertical coordinate y_min and the maximum vertical coordinate y_max of the area is the vertical coordinate of the center coordinates X_0 and Y_0. Subsequently, the reference length calculating unit 110 determines an average value ((a+b)/2) of half (a=(x_max−x_min)/2) of a distance between the minimum horizontal coordinate and maximum horizontal coordinate of the area and half (b=(y_max−y_min)/2) of a distance between the minimum vertical coordinates and maximum vertical coordinates of the area as the reference length len_max.

The pixel length calculating unit 120 sequentially receives each of the pixels of the image in which an area is set, and calculates a pixel length being a distance between the pixel and the center coordinates of the area in the operation S120. Referring to FIG. 4, assuming that coordinates x_pos and y_pos are the coordinates of an input pixel, the pixel length len_xy is the square root of "(x_con)2+(y_con)2". Herein, x_con is a horizontal distance between an input pixel and the center coordinates of the area, and y_con is a vertical distance between an input pixel and the center coordinates of the area.

The section determining unit 130 compares the reference length len_max with a pixel length len_xy and selects a pixel, the pixel length len_xy of which is less than the reference length len_max. The section determining unit 130 determines a section including the selected pixel among predetermined sections according to a distance from the center coordinates X_0 and Y_0.

That is, as illustrated in FIG. 14, the section determining unit 130 selects a pixel included in a reference circle, wherein the center of the reference circle is the center coordinates X_0 and Y_0 and the radius of the reference circle is the reference length len_max.

Figure 15:
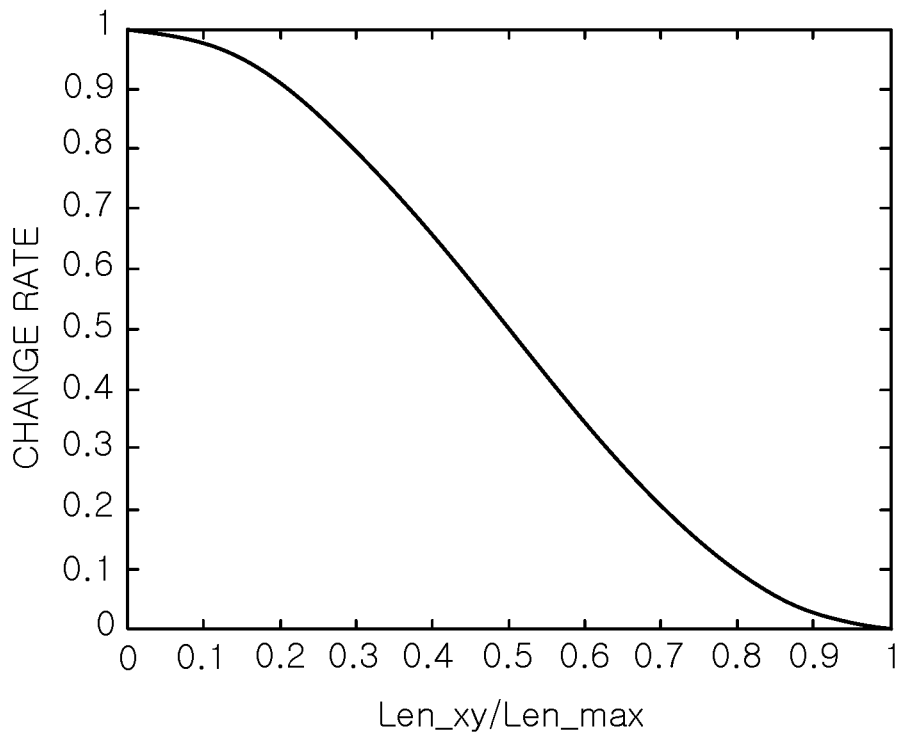
FIG. 15 is a graph illustrating a change rate when correction is performed on a selected pixel according to a relationship between a reference length and a coordinate length in an embodiment of the present invention.

The section determining unit 130 may apply a change rate of FIG. 15 in order for color or brightness to smoothly be changed according to the relationship between the reference length len_max and the pixel length len_xy, i.e., a position of a pixel included in the reference circle. The change rate is a concept corresponding to a brightness gain and a color gain to be described below, and it can be understood as that color is corrected by applying a gain which is gradually changed according to a position of a pixel for a natural color change.

As illustrated in FIG. 15, it is preferable to apply a change rate which is continuously changed according to a position of an input pixel, but an operation can very be complicated for implementing the change rate in hardware or software. Accordingly, as illustrated as dotted lines in FIGS. 16 to 19, an embodiment of the present invention may select a method that sets a plurality of sections according to a distance from center coordinates and applies the same gain to one section.

The section determining unit 130 sets a plurality of sections according to a distance from the center coordinates and determines which section of the sections an input pixel is in.

The image manipulating unit 140 sets a brightness gain and color gain for each section, and applies the brightness gain and the color gain to correct a pixel value of the selected pixel in the operation S140. Particularly, the image manipulating unit 140 applies segmented gains according to the brightness and color of an input pixel in the operations S141 and S142.

Figure 16:
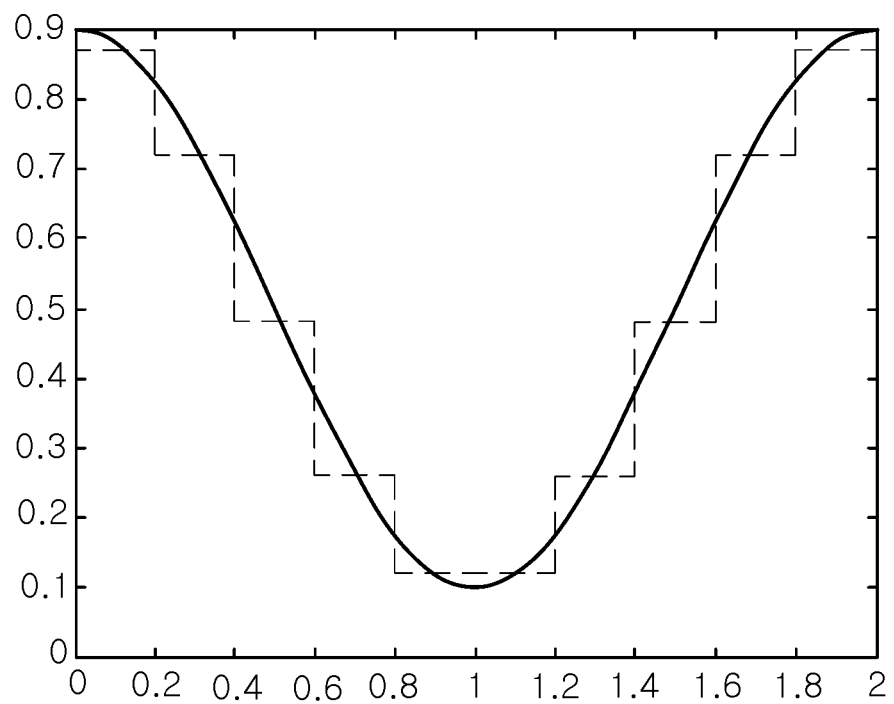
FIGS. 16 and 17 are graphs illustrating a change of a brightness gain according to a position of a selected pixel in an embodiment of the present invention.
Figure 17:
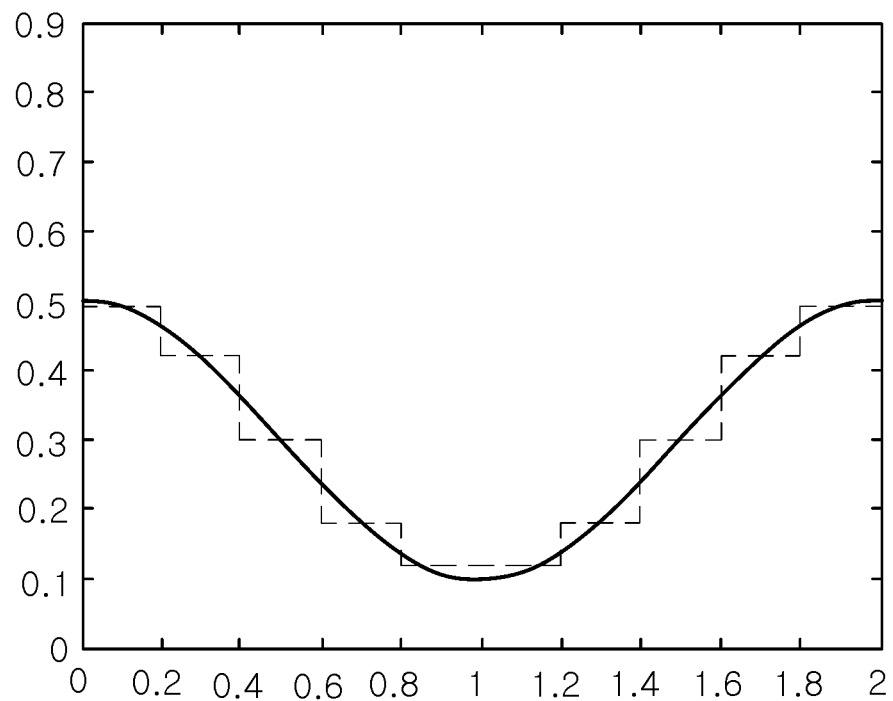

FIGS. 16 and 17 are graphs illustrating a change of a brightness gain in accordance with a position of a selected pixel in an embodiment of the present invention. In the graphs illustrated in FIGS. 16 and 17, the x axis represents a distance from a center coordinate (set the center coordinate as 1), and the y axis represents the brightness gain. For example, in a case where an input pixel has a high brightness value, a high gain is applied to a pixel disposed in the outermost area as illustrated in FIG. 16. On the other hand, in a case where an input pixel has a relatively low brightness value, a relatively low gain is applied to the pixel disposed in the outermost area as illustrated in FIG. 17, and thus a difference with a pixel near the center coordinate can be reduced.

Figure 18:
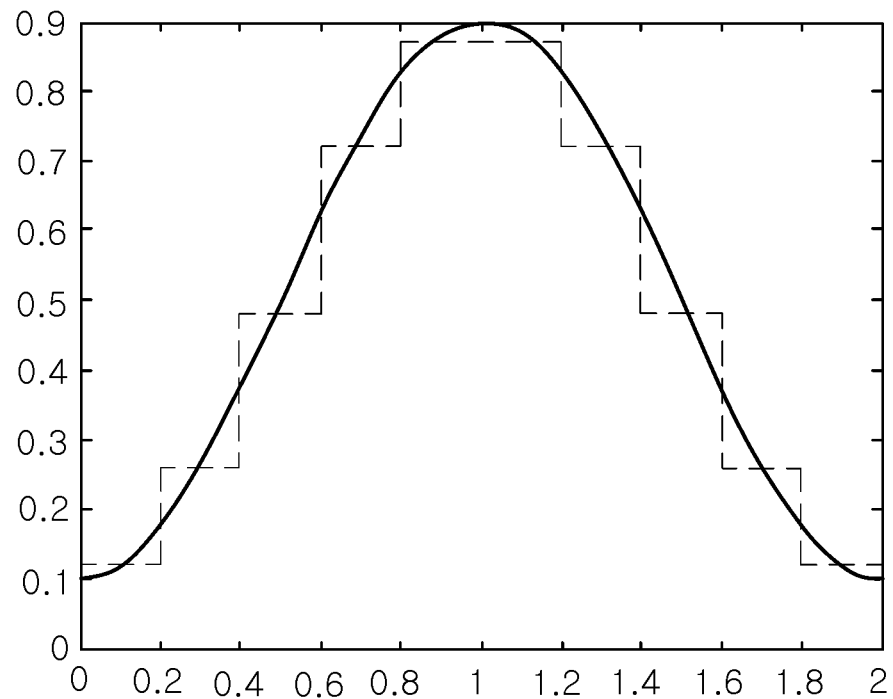
FIGS. 18 and 19 are graphs illustrating a change of a color gain according to a position of a selected pixel in an embodiment of the present invention.
Figure 19:
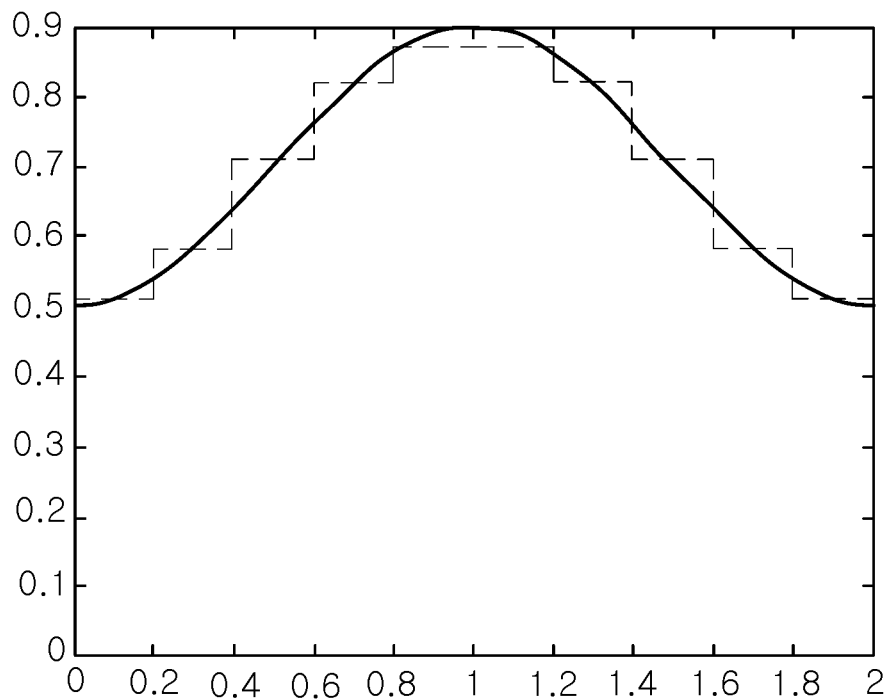

FIGS. 18 and 19 are graphs illustrating a change of a color gain according to a position of a selected pixel in an embodiment of the present invention. In the graphs illustrated in FIGS. 18 and 19, the x axis represents a distance from a center coordinate (set the center coordinate as 1), and the y axis represents the color gain. As opposed to the above-described brightness gain, the color gain is set to have a high gain as a pixel is nearest to the center coordinate. However, similarly to the above-described brightness gain, in a case where a color difference between a target color to be changed and a current input pixel is great, a high gain is applied to a pixel disposed in the outermost area as illustrated in FIG. 18. On the other hand, in a case where the color difference between the target color and the current input pixel is less, a relatively low gain is applied to the pixel disposed in the outermost area as illustrated in FIG. 19, and thus a difference with a center area can be reduced.

A brightness reference for selecting one brightness gain to be applied among the brightness gains of FIGS. 16 and 17 and a color reference for selecting one color gain to be applied among the color gains of FIGS. 18 and 19 may suitably be selected by a user.

Moreover, in a case where the color of an input pixel is the same as the skin color or is a very bright color such as the highlight, the image manipulating unit 140 bypasses a corresponding pixel without correcting the brightness and color of the corresponding pixel.

Figure 20:
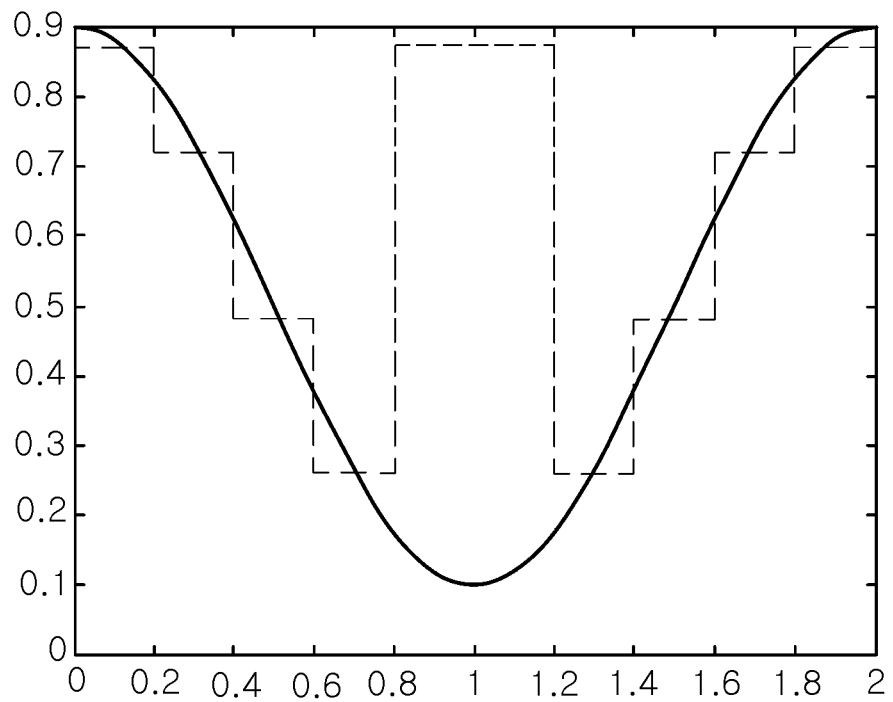
FIGS. 20 and 21 are graphs illustrating a change of a brightness gain applied to a highlight process on a section including center coordinates in an embodiment of the present invention.
Figure 21:
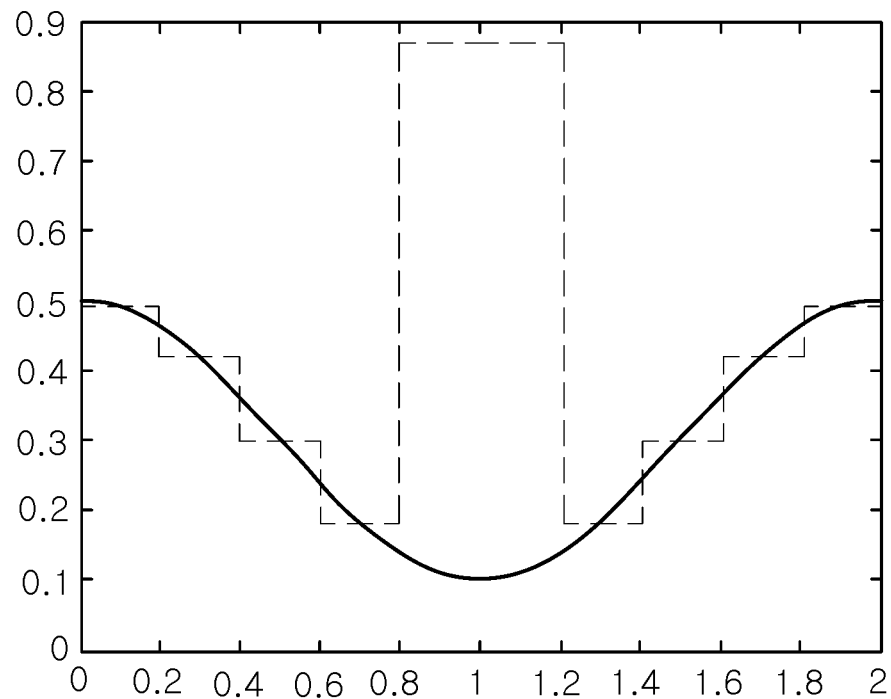
Figure 22:
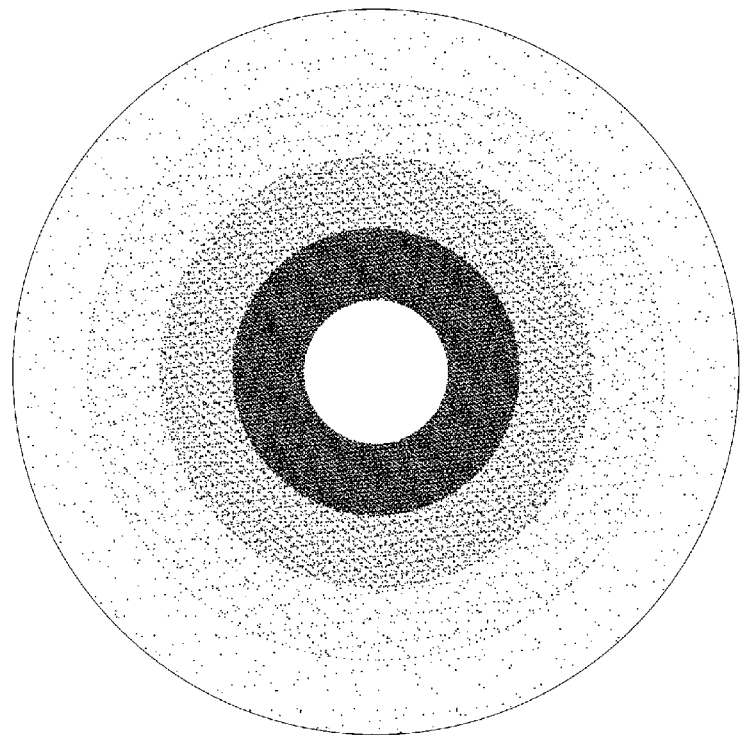
FIG. 22 is an exemplary diagram of an eye image to which a highlight process applied on a section including center coordinates in an embodiment of the present invention.

In a case where an image representing eyes becomes highlight having no color due to the reflection of light occurring in the center area of the eyes, the image represents more excellent natural eyes in terms of a fine view. The image manipulating unit 140 may determine the brightness gain in order for a section including the center coordinates among sections including a pixel to almost be highlight by applying such an advantage. That is, as illustrated as dotted lines in FIGS. 20 and 21, the image manipulating unit 140 may very brightly represent an eye image by applying a gain nearest to 1 to a center section including the center coordinates. In a case where such a gain is applied, as illustrated in FIG. 22, a natural image of an eye can be obtained, in which the cornea darkens toward and then sparkles at the center.

For example, in a case where a gain of a specific section determined according to the above-described processes is determined in a YCbCr color space, the brightness value Y, color value Cb and color value Cr of a pixel is determined as expressed in Equations 1 to 3 below.

$$Y'=Ly \times Y \qquad (1)$$

$$Cb'=Cb+(Sb-Cb) \times Jb \qquad (2)$$

$$Cr'=Cr+(Sr-Cr) \times Jr \qquad (3)$$

In the Equations 1 to 3, Y represents the Y value of the selected pixel, Cb represents the Cb value of the selected pixel, Cr represents the Cr value of the selected pixel, Ly represents a Y gain for each section, Sb represents a target Cb value to be corrected, Jb represents a Cb gain for each section, Sr represents a target Cr value to be corrected, Jr represents a Cr gain for each section, Y' represents the corrected Y value of the selected pixel, Cb' represents the corrected Cb value of the selected pixel, and Cr' represents the corrected Cr value of the selected pixel.

As described above, embodiments of the present invention segment sections according to a distance from the center of eyes and apply a gain which is gradually changed according to the sections, and thus can obtain a natural eye image after removing red-eye. Moreover, since embodiments of the present invention can remove red-eye in real time in a pixel order of an input image, they can perform a quick process and require no separate many memory spaces.

Embodiments of the present invention can perform a real-time segmentation on the pixels of a progressive input image, thereby considerably reducing a time taken in the segmentation of the 2D image.

Embodiments of the present invention can omit additional hardware resources such as a microprocessor by requiring no complicated operation for the segmentation of the 2D image, thereby reducing the cost spent for the implementation of hardware.

Embodiments of the present invention have no image-manipulated trace because an image after the removal of red-eye is very natural and can perform a real-time manipulation by a pixel unit of an input image, thereby reducing a memory space and an amount of operation for a red-eye removing operation.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for removing red-eye in a two-dimensional (2D) image, comprising:
   a reference length calculating unit receiving coordinate information of an area comprising red-eye in an entire image, and determining center coordinates of the area and a reference length from the center coordinates;
   a pixel length calculating unit sequentially receiving each of pixels of the image, and calculating a pixel length being a distance between the each pixel and the center of the area;
   a section determining unit comparing the reference length with a pixel length, selecting a pixel, the pixel length of which is less than the reference length, and determining a section comprising the selected pixel among predetermined sections according to a distance from the center coordinates; and
   an image manipulating unit setting a brightness gain and color gain for each section, and applying the brightness gain and the color gain to correct a pixel value of the selected pixel.

2. The apparatus of claim 1, wherein the reference length calculating unit calculates the center coordinates, and determines an average value of half of a distance between the minimum horizontal coordinates and maximum horizontal coordinates of the area and half of a distance between the minimum vertical coordinates and maximum vertical coordinates of the area as the reference length,
   wherein a middle coordinate of a minimum horizontal coordinate and maximum horizontal coordinate of the area is a horizontal coordinate of the center coordinates, and a middle coordinate of a minimum vertical coordinate and maximum vertical coordinate of the area is a vertical coordinate of the center coordinates.

3. The apparatus of claim 1, wherein the image manipulating unit differently sets the brightness gain for the each section according to the brightness value of the selected pixel, and differently sets the color gain for the each section according to a difference between the color value of the selected pixel and a target color value to be corrected.

4. The apparatus of claim 3, wherein when the selected pixel is highlight or has the same color as a skin color, the image manipulating unit bypasses the selected pixel without correcting a brightness and color of the selected pixel.

5. The apparatus of claim 1, wherein the image manipulating unit determine the brightness gain in order for a section comprising the center coordinates among the sections to be highlight.

6. The apparatus of claim 1, wherein the image manipulating unit corrects Y, Cb and Cr values of the selected pixel as expressed in Equations below:

$$Y'=Ly \times Y;$$

$$Cb'=Cb+(Sb-Cb) \times Jb; \text{ and}$$

$$Cr'=Cr+(Sr-Cr) \times Jr,$$

where Y represents the Y value of the selected pixel, Cb represents the Cb value of the selected pixel, Cr represents the Cr value of the selected pixel, Ly represents a Y gain for the each section, Sb represents a target Cb value to be corrected, Jb represents a Cb gain for each section, Sr represents a target Cr value to be corrected, Jr represents a Cr gain for the each section, Y' represents a corrected Y value of the selected pixel, Cb' represents a corrected Cb value of the selected pixel, and Cr' represents a corrected Cr value of the selected pixel.

7. A method for removing red-eye in a two-dimensional (2D) image, comprising:
   receiving coordinate information of an area comprising red-eye in an entire image, using one or more processors;
   determining a reference length from the center coordinates and center coordinates of the received area;

sequentially receiving each of pixels of the image, and calculating a pixel length being a distance between the each pixel and the center of the area;

comparing the reference length with a pixel length, selecting a pixel, the pixel length of which is less than the reference length, and determining a section comprising the selected pixel among predetermined sections according to a distance from the center coordinates; and setting a brightness gain and color gain for each section, and applying the brightness gain and the color gain to correct a pixel value of the selected pixel.

8. The method of claim 7, wherein the determining of the reference length comprises:

calculating the center coordinates; and determining an average value of half of a distance between the minimum horizontal coordinates and maximum horizontal coordinates of the area and half of a distance between the minimum vertical coordinates and maximum vertical coordinates of the area as the reference length, wherein a middle coordinate of a minimum horizontal coordinate and maximum horizontal coordinate of the area is a horizontal coordinate of the center coordinates, and a middle coordinate of a minimum vertical coordinate and maximum vertical coordinate of the area is a vertical coordinate of the center coordinates.

9. The method of claim 7, wherein the setting of the gains comprises:

differently setting the brightness gain for the each section according to the brightness value of the selected pixel; and differently setting the color gain for the each section according to a difference between the color value of the selected pixel and a target color value to be corrected.

10. The method of claim 9, wherein the setting of the gains comprises bypassing the selected pixel without correcting a brightness and color of the selected pixel when the selected pixel is highlight or has the same color as a skin color.

11. The method of claim 7, wherein the setting of the gains comprises determining the brightness gain in order for a section comprising the center coordinates among the sections to be highlight.

12. The method of claim 7, wherein the setting of the gains comprises correcting Y, Cb and Cr values of the selected pixel as expressed in equations below:

$$Y' = Ly \times Y;$$

$$Cb' = Cb + (Sb - Cb) \times Jb; \text{ and}$$

$$Cr' = Cr + (Sr - Cr) \times Jr,$$

where Y represents the Y value of the selected pixel, Cb represents the Cb value of the selected pixel, Cr represents the Cr value of the selected pixel, Ly represents a Y gain for the each section, Sb represents a target Cb value to be corrected, Jb represents a Cb gain for each section, Sr represents a target Cr value to be corrected, Jr represents a Cr gain for the each section, Y' represents a corrected Y value of the selected pixel, Cb' represents a corrected Cb value of the selected pixel, and Cr' represents a corrected Cr value of the selected pixel.

* * * * *

UNITED STATES PATENT AND TRADEMARK OFFICE
CERTIFICATE OF CORRECTION

PATENT NO. : 8,515,169 B2  
APPLICATION NO. : 13/616592  
DATED : August 20, 2013  
INVENTOR(S) : Kang Joo Kim et al.

Page 1 of 1

It is certified that error appears in the above-identified patent and that said Letters Patent is hereby corrected as shown below:

Title Page Col. 1, After Prior Publication Data please insert
-- Related U.S. Application Data
(62) Division of application No. 12/273,878, filed on Nov. 19, 2008. --

Signed and Sealed this
Twenty-fourth Day of December, 2013

Margaret A. Focarino
*Commissioner for Patents of the United States Patent and Trademark Office*